United States Patent
Gilbertson et al.

(10) Patent No.: US 9,145,974 B2
(45) Date of Patent: *Sep. 29, 2015

(54) APPARATUS FOR ADJUSTING SHAPE MEMORY ALLOY TRANSITION TEMPERATURES TO TRACK SLOWLY CHANGING AMBIENT TEMPERATURE

(71) Applicants: Chevron U.S.A. Inc., San Ramon, CA (US); Massachusetts Institute of Technology, Cambridge, MA (US)

(72) Inventors: Eric Wright Gilbertson, Cambridge, MA (US); Changkuan Yu, Cambridge, MA (US); Franz Hover, Somerville, MA (US); Dennis Harris, Houston, TX (US); Jose Arellano, Houston, TX (US)

(73) Assignees: Massachusetts Institute of Technology, Cambridge, MA (US); Chevron U.S.A. Inc., San Ramon, CA (US)

( * ) Notice: Subject to any disclaimer, the term of this patent is extended or adjusted under 35 U.S.C. 154(b) by 190 days.

This patent is subject to a terminal disclaimer.

(21) Appl. No.: 13/691,240

(22) Filed: Nov. 30, 2012

(65) Prior Publication Data

US 2014/0150879 A1 Jun. 5, 2014

(51) Int. Cl.
*F16K 31/00* (2006.01)

(52) U.S. Cl.
CPC ......... *F16K 31/002* (2013.01); *Y10T 137/0324* (2015.04); *Y10T 137/7737* (2015.04)

(58) Field of Classification Search
CPC ....... E21B 21/10; E21B 43/12; F16K 31/002; Y10T 137/7737; Y10T 137/0324

USPC ................. 137/155, 79; 251/315.01, 315.06, 251/129.06, 11

See application file for complete search history.

(56) References Cited

U.S. PATENT DOCUMENTS

| | | | | | |
|---|---|---|---|---|---|
| 3,366,140 | A | * | 1/1968 | Dunn | 137/596.17 |
| 3,613,732 | A | * | 10/1971 | Willson et al. | 137/625.44 |
| 3,760,832 | A | * | 9/1973 | McGowen et al. | 137/155 |
| 4,284,235 | A | * | 8/1981 | Diermayer et al. | 236/1 G |
| 4,569,206 | A | * | 2/1986 | Mitani et al. | 62/156 |
| 4,619,320 | A | * | 10/1986 | Adnyana et al. | 166/66.7 |
| 4,806,815 | A | * | 2/1989 | Honma | 310/307 |
| 4,884,780 | A | * | 12/1989 | Ohashi | 251/11 |
| 4,973,024 | A | * | 11/1990 | Homma | 251/11 |
| 4,979,672 | A | * | 12/1990 | AbuJudom et al. | 236/68 B |
| 5,071,064 | A | * | 12/1991 | AbuJudom et al. | 236/1 G |
| 5,417,367 | A | * | 5/1995 | Baclet et al. | 236/93 R |
| 6,427,712 | B1 | * | 8/2002 | Ashurst | 137/62 |
| 7,744,059 | B2 | * | 6/2010 | Jerg | 251/11 |
| 7,748,405 | B2 | * | 7/2010 | Ghorbal et al. | 137/596.17 |
| 2005/0173661 | A1 | * | 8/2005 | Mignon et al. | 251/11 |

(Continued)

*Primary Examiner* — Craig Schneider
*Assistant Examiner* — David Colon Morales
(74) *Attorney, Agent, or Firm* — Gesmer Updegrove LLP

(57) ABSTRACT

A valve actuator, valve, and method of actuation of a valve are disclosed. The valve actuator includes a shape memory alloy element attachable to a valve body, capable of use with a valve to cause movement of the valve between first and second positions at a predetermined temperature and responsive to at least a threshold amount of temperature change of the shape memory alloy element. The valve actuator further includes an expansion element attached to the shape memory alloy element, the expansion element responsive to temperature changes at a rate lower than a rate of change of temperature indicative of a valve leak, the expansion element adjusting tension on the shape memory alloy element, thereby changing the predetermined temperature.

18 Claims, 11 Drawing Sheets

(56) References Cited

U.S. PATENT DOCUMENTS

| | | | |
|---|---|---|---|
| 2007/0028964 A1* | 2/2007 | Vasquez et al. | 137/457 |
| 2009/0139727 A1* | 6/2009 | Tanju et al. | 166/373 |
| 2009/0151924 A1* | 6/2009 | Lake | 166/53 |
| 2009/0229824 A1* | 9/2009 | Ocalan et al. | 166/303 |
| 2012/0247780 A1* | 10/2012 | Gilbertson et al. | 166/330 |
| 2013/0146155 A1* | 6/2013 | Gilbertson et al. | 137/468 |
| 2014/0150869 A1* | 6/2014 | Yu et al. | 137/1 |

* cited by examiner

APPARATUS FOR ADJUSTING SHAPE MEMORY ALLOY TRANSITION TEMPERATURES TO TRACK SLOWLY CHANGING AMBIENT TEMPERATURE

TECHNICAL FIELD

The present disclosure relates generally to thermal actuators. In particular, the present disclosure relates to an arrangement including a sharp phase change shape memory alloy thermal actuator that is arranged to track gradual changes to ambient temperatures.

BACKGROUND

Gas-lifting is an artificial lifting method used to produce oil from wells that do not flow naturally. In gas-lifted wells, gas is injected through the well annulus and into the well tubing at a down-well location. The gas mixes with the oil in the tubing, aerating the oil and causing it to rise to the surface.

To pass through the annulus to the tubing, the injection gas flows through a valve commonly referred to as a gas lift valve. Gas lift valves are one-way valves that allow gas to pass from the annulus to the tubing but prevent oil from passing through to the annulus. Most valves contain a pressurized bellows and an internal check valve. The bellows opens when the injection gas is pressurized above a threshold value, and the internal check valve prevents oil from passing through the gas lift valve.

A gas lift valve can fail if it allows oil passage from the tubing to the annulus. For failure to occur, at least two conditions are simultaneously met: (1) the reverse-flow check valve has a leak and the tubing pressure exceeds the gas pressure; and (2) a combination of high tubing pressure and low gas pressure allows the bellows valve to open. Further, if both the check valve and the bellows valve leak, then backflow can occur any time the tubing pressure exceeds the annulus pressure.

Proper function of gas lift valves is very important for the safety of the well and surface operations. For example, if hydrocarbons flow through the annulus and reach the wellhead, an undesired accumulation of high-pressure combustible materials may occur at the well and surface, and hence may increase the risk of injury to personnel and/or damage to equipment, as well as disruptions in operation. Gas lift valves are thus susceptible to leakage, with seal corrosion being a major contributing factor.

Existing gas-lift safety valve designs are designed to actuate and close in the event of temperatures changes (signifying possible leakage of the valve), preventing backflow in the event of a change in temperature at the safety valve. However, these designs have disadvantages. For example, existing designs generally require a temperature difference of at least about 6° C. for actuation. This temperature difference is not always present in the event of a valve leak; therefore, risk of backflow remains in circumstances where small temperature variations exist.

Still further compounding this issue, gradual changes to temperature may occur which are not the result of (and do not signify) leakage of a safety valve. In such circumstances, a gradual rise in temperature over time, which may be attributable to other effects, may be detected by the safety valve as a possible leak, causing the safety valve to actuate and close when no leakage in fact exists. Accordingly, gas-lift safety valve designs experience the dual challenges of being required to actuate in the event of small temperature changes, while not falsely actuating in the event of gradual temperature changes.

SUMMARY

In accordance with the following disclosure, the above and other issues are addressed by the following:

In a first aspect, a valve actuator includes a shape memory alloy element attachable to a valve body, capable of use with a valve to cause movement of the valve between first and second positions at a predetermined temperature and responsive to at least a threshold amount of temperature change of the shape memory alloy element. The valve actuator further includes an expansion element attached to the shape memory alloy element, the expansion element responsive to temperature changes at a rate lower than a rate of change of temperature indicative of a valve leak, the expansion element adjusting tension on the shape memory alloy element, thereby changing the predetermined temperature.

In a second aspect, a valve includes a valve body, an orifice within the valve body, and a fluid flow restraining member located at a first location of the orifice. The fluid flow restraining member movable between a closed position and an open position. The valve further includes a shape memory alloy element connected to the fluid flow restraining member, the shape memory alloy element causing pivotal movement of the fluid flow restraining member between open and closed positions responsive to at least a threshold amount of temperature change of the shape memory alloy element. The valve further includes an expansion element attached to the shape memory alloy element, the expansion element responsive to temperature changes at a rate lower than a rate of change of temperature indicative of a valve leak, the expansion element adjusting tension on the shape memory alloy element, thereby changing the threshold amount of temperature change.

In a third aspect, a method of actuating a valve from an open position to a closed position includes experiencing a first temperature change from a first temperature to a second temperature at the valve over a first amount of time, and adjusting a tensile stress on a shape memory alloy element used to actuate the valve in response to the first temperature change, thereby adjusting a threshold temperature at which the shape memory alloy element actuates. The method further includes experiencing a second temperature change at a valve actuator including the shape memory alloy element over a second amount of time, and actuating the valve between the open position and the closed position in response to the second temperature change, wherein the second temperature change is greater than the threshold temperature and the second amount of time is shorter than the first amount of time.

BRIEF DESCRIPTION OF THE DRAWINGS

The systems and methods described herein can be better understood with reference to the following drawings. The components in the drawings are not necessarily drawn to scale, emphasis instead being placed upon clearly illustrating the principles of the present disclosure. In the drawings, like reference numerals designate corresponding parts throughout the several views.

DETAILED DESCRIPTION

Disclosed herein are certain embodiments of a thermal actuator implemented using a shape memory alloy (SMA). The thermal actuator can be used as a valve actuator, such as for a gas lift safety valve used in a gas-lifted well. Additionally, thermal signaling in SMA-actuated flow control elements can be applied in a variety of operational scenarios, because no power or communication is needed. Furthermore, in some embodiments discussed herein, additional compensating forces are applied to allow for gradual changes in ambient temperatures near the thermal actuator, for example occurring in an environment near a gas lift safety valve.

In some embodiments, the thermal actuator includes a shape memory alloy element attachable to a valve body and capable of use with a valve to cause movement of the valve between first and second positions responsive to a threshold amount of temperature change of the shape memory alloy element. In such embodiments, a negative-differential spring is applied to the shape memory alloy element, thereby reducing the threshold amount of temperature change needed to cause movement of the valve between first and second positions. The thermal actuator provides for a sharp phase change, such that thermally-actuated valves with which it is associated will be applicable to a larger range of applications and available temperature differences. In such embodiments, a temperature at which the thermal actuator is actuated can be adjusted to compensate for gradual temperature changes by applying a variable force to the shape memory alloy.

These advantages and/or features, among others, are described hereinafter in the context of a gas-lifted oil well environment, with the understanding that other applications and/or environments exist in which such a thermal actuator may be advantageous. Generally, in the context of a gas-lifted oil well, other applications may exist where unsatisfactory consequences of failure of a downstream check valve (integrated or otherwise) may be ameliorated or eliminated using the embodiments described herein. Further, it should be understood by one having ordinary skill in the art that, though specifics for one or more embodiments are disclosed herein, such specifics as described are not necessarily part of every embodiment.

Figure 1:
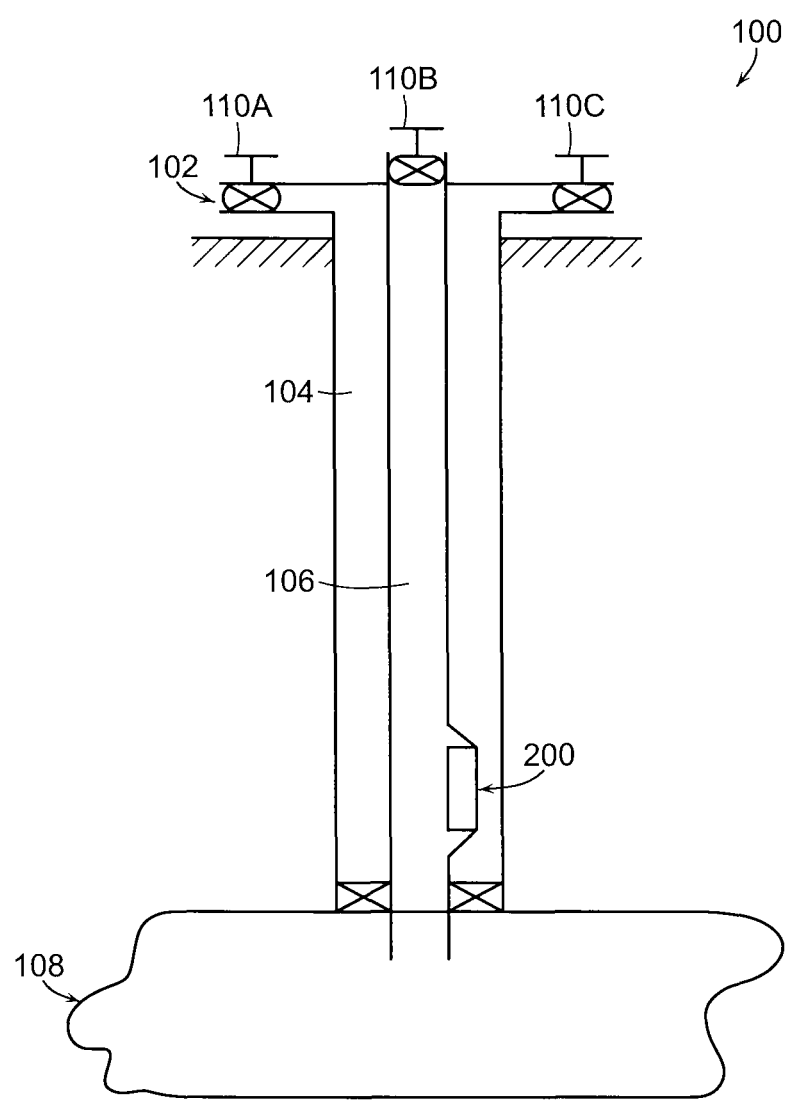
FIG. 1 is a schematic diagram of an example environment in which an embodiment of a thermally-actuated gas lift safety valve may be implemented.
Figure 2:
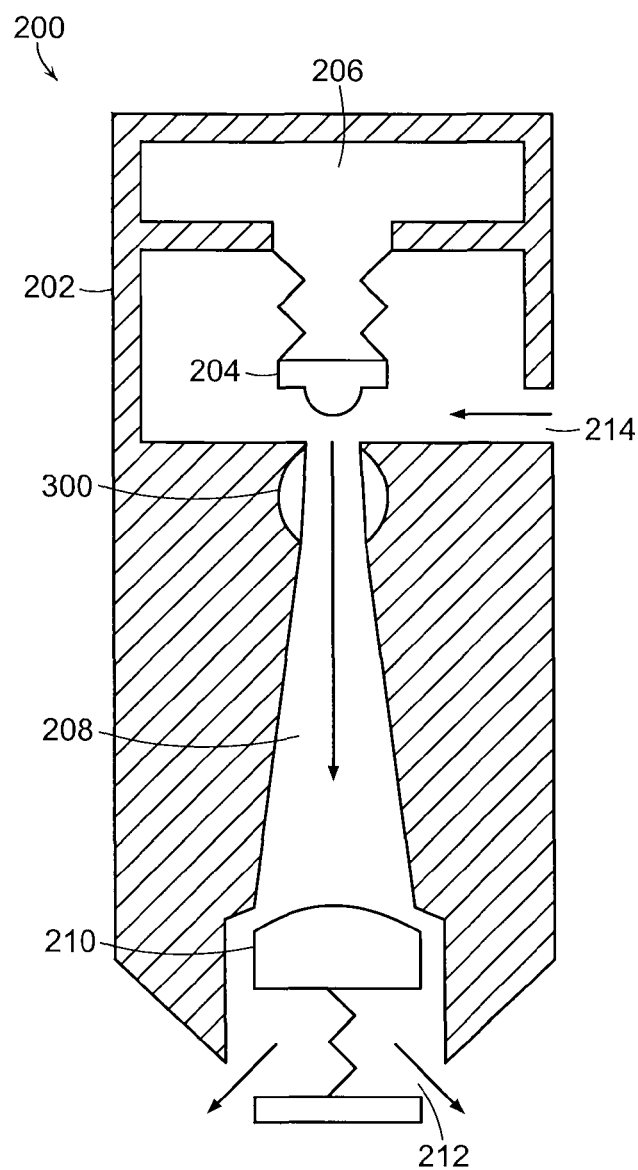
FIG. 2 is a schematic diagram that generally depicts an embodiment of a thermally-actuated gas lift safety valve.
Figure 3:
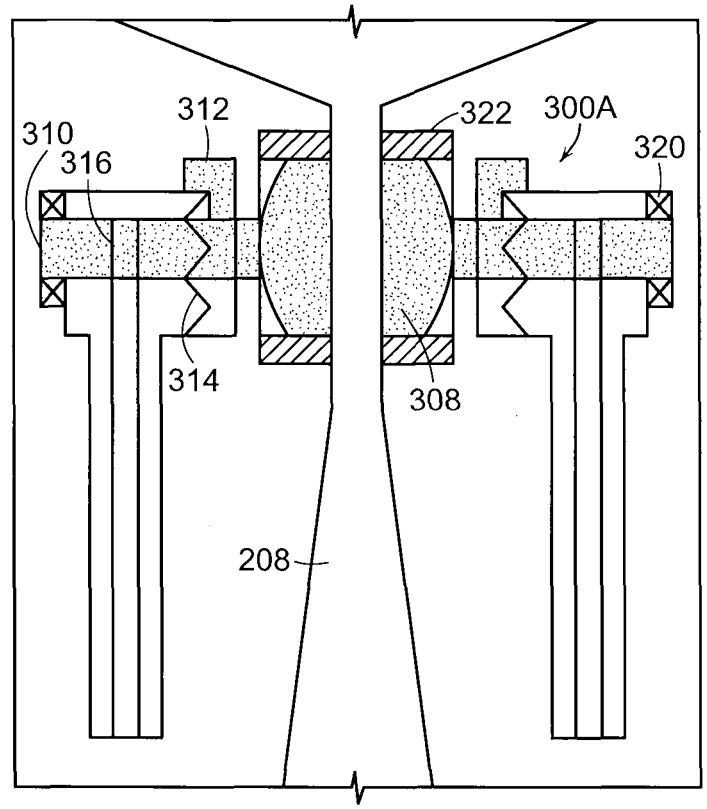
FIG. 3 is a schematic diagram that shows a partial cutaway, side elevation view of an embodiment of a thermally-actuated gas lift safety valve in which a shape memory alloy element can be incorporated.

Referring generally to FIGS. 1-3, an example embodiment of a gas lift safety valve is illustrated in which a thermal actuator using a shape memory alloy can be implemented. Attention is first directed to FIG. 1, which is an example environment in which embodiments of a thermal actuator according to the present disclosure can be employed. In this example application, the thermal actuator can be integrated into a thermally-actuated gas lift safety valve. In particular, FIG. 1 depicts a gas-lifted oil well 100 in which a thermally-actuated gas lift safety valve 200 is used. It should be understood by one having ordinary skill in the art, in the context of the present disclosure, that the gas-lifted oil well 100 shown in FIG. 1 is merely illustrative, and should not be construed as implying any limitations upon the scope of the disclosure. The gas-lifted oil well 100 comprises a piping infrastructure 102 located both partially above and beneath (e.g., extending 5 km beneath, though not limited to such applications) the sea floor (the latter indicated by diagonal lines in FIG. 1). The piping infrastructure 102 comprises an annulus 104 surrounding tubing 106, the tubing extending into a reservoir 108 of crude oil. Proximal to the sea floor surface are safety valves (e.g., flapper valves) 110A and 110C (restricting fluid flow through the annulus 104) and safety valve (e.g., flapper valve) 110B (restricting fluid flow through the tubing 106). Though described using flapper valves 110A, 110B, and 110C, other valves with similar functionality may be used as is known in the art. The thermally-actuated gas lift safety valve 200 enables gas to be injected from the annulus 104 to the tubing 106 to aerate the oil sourced from the reservoir 108, while preventing the ingress of the oil as it flows via aeration through the tubing 106 and to the annulus 104.

Referring now to FIG. 2, a thermally-actuated gas lift safety valve 200 is shown in schematic, generalized (partially cut-away, upright position) form. The thermally-actuated gas lift safety valve 200 represents an example valve that could include a thermal actuator having a sharp phase change, as discussed further below. It should be understood by one having ordinary skill in the art, in the context of the present disclosure, that the thermally-actuated gas lift safety valve 200 shown in FIG. 2 is merely illustrative, and should not be construed as implying any limitations upon the scope of the disclosure.

The thermally-actuated gas lift safety valve 200 includes a valve body 202 suitably constructed with a material to withstand sub-sea surface pressure and/or temperatures (e.g., well temperatures may range from 20° C. to 70° C.). Enclosed within one end (proximal to the annulus 104, or as depicted in FIG. 2, the topmost position) of the valve body 202 is a bellows valve 204, depicted in FIG. 2 with a bellows chamber 206 for containing a suitable pressurized gas, such as nitrogen gas, among others. It should be understood that other configurations for a bellows valve 204 may be used in some embodiments, including those that use a spring with a charged bellows assist, among others well-known to those having ordinary skill in the art. Adjacent to (e.g., immediately beneath) the bellows valve 204 is a fluid flow restraining member assembly 300, which in one embodiment comprises a ball valve, stem, and extending member(s) as explained further below. The fluid flow restraining member assembly 300 resides adjacent the bellows valve 204 and proximal to a gas inlet end of an orifice 208, which in one embodiment is configured as a Venturi orifice. In some embodiments, the orifice 208 may be configured according to a different structure, such as a square-edged orifice. Proximal to the opposite end of the orifice 208 is a check valve 210, which allows fluid flow to be discharged from an outlet 212 of the thermally-actuated gas lift safety valve 200 while inhibiting flow in the reverse direction (e.g., toward the fluid flow restraining member assembly 300). In some embodiments, the check valve 210 may be implemented as an apparatus separate from the thermally-actuated gas lift safety valve 200, yet used in combination.

In an example aeration operation, as depicted in FIG. 2 by the use of arrows (with continued reference to FIG. 1), flow of gas to aerate the oil of the reservoir 108 proceeds from the annulus 104 to an inlet of the thermally-actuated gas lift safety valve 200. Upon the pressure of the gas from the annulus 104 overcoming the pressurized gas of the bellows valve 204, the bellows valve 204 opens and the gas flows through the opened ball valve of the fluid flow restraining member assembly 300, through the orifice 208, and past the check valve 210 and outlet 212 and into the tubing 106.

Referring to FIG. 3, a partial cut-away (e.g., side elevation) schematic view of portions of a thermally-actuated gas lift safety valve 200A are shown. In particular, an example valve 200A of the fluid flow restraining member assembly 300 (depicted in FIG. 3 with reference numeral 300A) situated between the bottom of the bellows valve 204 and proximal to the one end of the orifice 208. The fluid flow restraining member assembly 300A includes the ball valve 308 and extending members 310 extending in one embodiment from opposing sides of the ball valve 308. Each extending member 310 is connected to a stopper 312 located proximally to the ball valve 308, the former which serves to constrain rotation of the fluid flow restraining member assembly 300A. A force assist member (e.g., spring) 314 is radially wound about at least a portion of each extending member 310. Shape memory alloy elements 316 are attached to each extending member 310 to enable rotation actuation. The respective extending members 310 further comprise lubricated joint bearings 320 at each end (end opposite the end adjacent to the stopper 312) for valve rotation. Sealing members 322 create a water-tight seal at the ball valve openings. Sealing members 322 may be embodied as elastomeric O-rings, or in some embodiments, other types of well-known water-tight sealing material such as packing, etc.

Additional details regarding such a gas-lift safety valve are disclosed in U.S. patent application Ser. No. 13/075,424 "Thermally-Actuated Gas-Lift Safety Valve", the entire disclosure of which is hereby incorporated by reference in its entirety. That application describes use of a commercially available shape memory alloy (SMA) as an actuator in such a valve. However, using the gas-lift safety valve as contemplated therein, there may be some circumstances where actuation may not occur properly. This is because typically such an SMA relies on a well-bore fluid temperature difference of at least 6° C. to completely actuate. Because some wells may have less than 6° C. temperature difference, the safety valve design described in that earlier application could not be applied.

Figure 4:
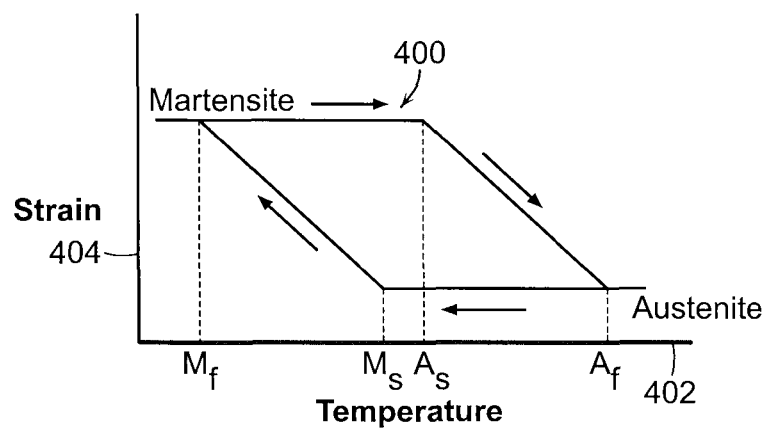
FIG. 4 is a hysteresis diagram that illustrates an example operation of the shape memory alloy element of an embodiment of a thermally-actuated gas lift safety valve.

A further understanding of example operation of one possible thermal actuator using a shape memory alloy is provided generally in accordance with a hysteresis diagram 400, as shown in FIG. 4. The diagram 400 includes a horizontal axis 402 corresponding to temperature, and a vertical axis 404 corresponding to strain. In general, shape memory alloys are alloys that undergo a solid state phase change between a Martensitic low-temperature state and an Austenitic high-temperature state when heated or cooled. These types of alloys are said to have "memory" because they return to the same low-temperature shape whenever cooled to the Martensitic state and to the same high-temperature shape when heated to the Austenitic state. As illustrated in FIG. 4, shape memory alloys do not have a single transition temperature between Martensite and Austenite, but instead undergo a hysteresis, with different transition temperatures depending on whether the alloy is being cooled or heated. Referring to FIG. 4, when the alloy is being heated, $A_s$ represents the start of the transition from Martensite to Austenite and $A_f$ represents the final transition to Austenite. When being cooled, $M_s$ represents the start of the transition from Austenite to Martensite and $M_f$ represents the final transition to Martensite. Based on the alloy proportion, a shape memory alloy may have transition temperatures within the range of −150° C. to +800° C. It should be understood in the context of the present disclosure that transition temperatures of the shape memory alloy elements 316 may be "tuned" to match any or substantially any given well conditions (e.g., manufacturers may alter the alloy composition to achieve different transition temperatures).

Figure 5A:
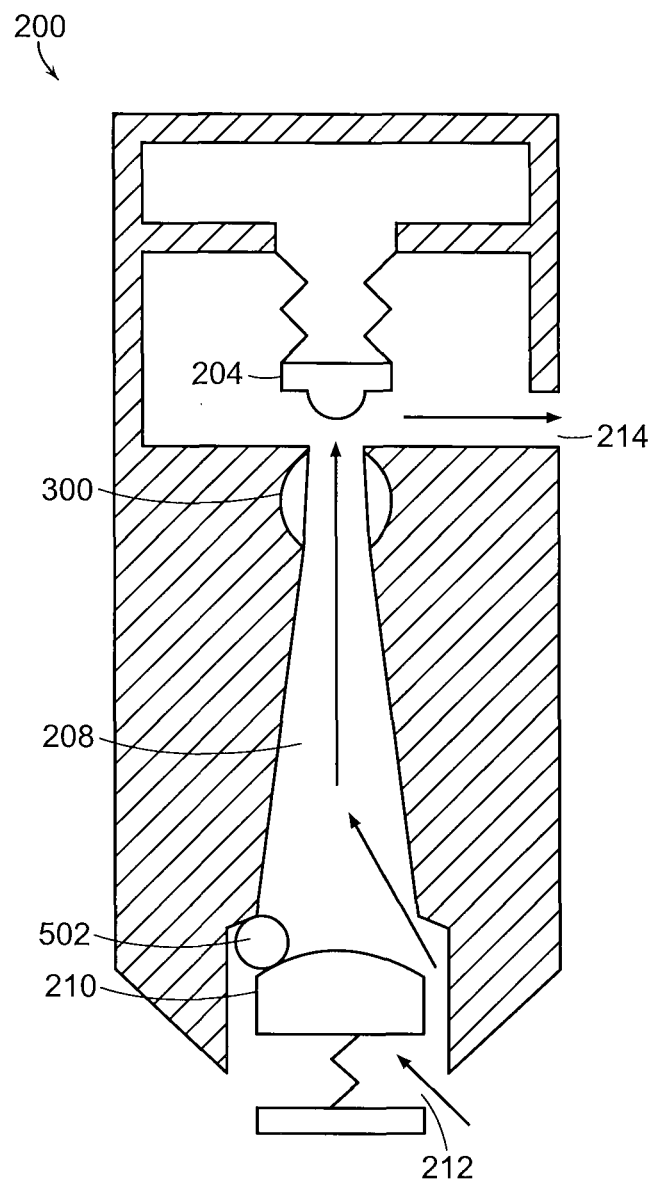
FIGS. 5A-5B are schematic diagrams that illustrate an example operation of an embodiment of a thermally-actuated gas lift safety valve when debris hinders proper operation of a check valve integrated into the thermally-actuated gas lift safety valve.
Figure 5B:
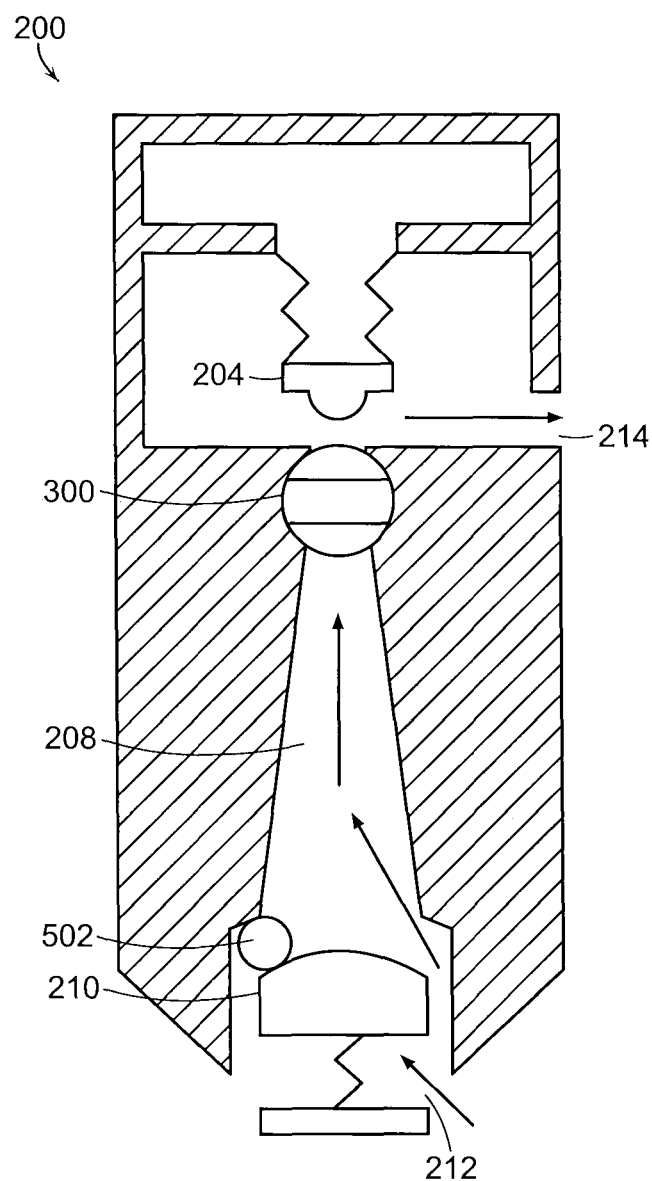

FIGS. 5A-5B are schematic diagrams that illustrate an example circumstance in which the thermally-actuated gas lift safety valve 200 of FIG. 2 may be actuated. In particular, FIGS. 5A-5B illustrate an example of operation of the thermally-actuated gas lift safety valve 200 when debris hinders proper operation of a check valve integrated into the thermally-actuated gas lift safety valve (i.e., failure mode operation of the valve).

It is noted that the thermally-actuated gas lift safety valve 200 shown in FIGS. 5A-5B is the same as, or similar to, the thermally-actuated gas lift safety valve 200 shown in FIG. 2, with the addition of debris 502 trapped between the check valve 210 and an interior surface of the orifice 208. In general, the thermally-actuated gas lift safety valve 200 relies on the temperature difference between the injected gas in the annulus 104 and the oil in the tubing 106. When the gas is injected through the thermally-actuated gas lift safety valve 200, the valve 200 is cooler than during a backflow situation. Thus, in a backflow situation, the thermally-actuated gas lift safety valve 200 heats up and closes. More particularly, a thermal actuator including a shape memory alloy element 316 is set to have a transition temperature $A_s$ above the injected gas temperature and an $A_f$ value below the oil temperature. The $M_s$ and $M_f$ transition temperature values are set to values between the oil temperature and the coldest temperature attainable in the valve-cooling scenario.

The failure conditions depicted in FIG. 5A represent the presence of debris 502 trapped in the check valve 210 (though other mechanisms of failure that halt proper movement of the check valve are contemplated), and the annulus pressure required to open the bellows valve 204 ($P_{open}$) being less than the actual pressure in the annulus 104 ($P_{ann}$), which is less than the pressure in the tubing 106 ($P_{tube}$). In other words, $P_{open} < P_{ann} < P_{tube}$. Under these conditions, oil flows improperly (as indicated by the single-headed arrows in FIGS. 5A-5B) through the outlet 212 into the orifice 208, through the opened ball valve 308 and opened bellows valve 204 and through the inlet 214 into the annulus 104. As the oil begins passing through the thermally-actuated gas lift safety valve 200, the entire thermally-actuated gas lift safety valve 200 heats up, in turn heating up the shape memory alloy elements 316 (e.g., by conduction of the heat through the body or housing of the thermally-actuated gas lift safety valve 200) to the oil reservoir temperature. Further, the absence of the cooler injection gas together with the heat conduction affects the shape memory alloy elements 316. In other words, the shape memory alloy elements 316 contract as they heat up past $A_s$ and $A_f$, and thus pull the ball valve 308 (through actuation upon the extending members 310) into a closed (e.g., horizontal) position, as indicated in FIG. 5B.

If the shape memory alloy elements 316 cool and transition to the Martensite state, the shape memory alloy elements 316 expand and the force assist members 314 pull the ball valve 308 back into the open position. In other words, the force assist members 314 assist in restoring the ball valve 308 to the open position.

In applications in which the thermal actuation is required based on a relatively small change in temperature, it is advisable to have the Austenitic transition start temperature, $A_s$, be as close to the Austenitic transition final transition temperature, $A_f$. Although, as discussed in U.S. patent application Ser. No. 13/075,424, typical transition temperature differentials generally require a substantial change in temperature, it is recognized that the change in these temperatures is also dependent upon stress applied to the shape memory alloy. This can be expressed by the following equations, representing differences in $A_s$ and $A_f$ in response to strain:

$$A_{s\sigma} = A_s + \sigma/C$$

$$A_{f\sigma} = A_f + \sigma/C$$

where $A_{s\sigma}$ is the Austenite start transition temperature under external stress σ, $A_s$ is the Austenite start transition temperature under no external stress, $A_{f\sigma}$ is the Austenite finish transition temperature under external stress σ, $A_f$ is the Austenite finish transition temperature under no external stress, and C is a constant dependent on the material.

As such, if a greater strain were introduced at the point where a shape memory alloy were at the Austenitic transition start temperature, $A_s$, as compared to the Austenitic transition final transition temperature, $A_f$, the two temperatures could be closer. In accordance with the various configurations described below in FIGS. 6-13, application of a negative-differential spring to the shape memory alloy introduces greater strain at the lower $A_s$ temperature than at the higher $A_f$ temperature. As such, it is possible to arrange a thermal actuator that has a sharp response (i.e., an actuation response below the previously available 6° C. temperature variation). In particular, a variety of types of negative-differential spring arrangements can be used, such as a mass on a lever rotating from horizontal to vertical, a coiled metal ribbon of decreasing width, or a wire rotating a cam of decreasing radius.

In some embodiments, the negative-differential spring can be implemented as an opposing shape memory alloy element. In this differential SMA configuration, two SMA wires are attached antagonistically and each heated independently. One wire acts as the actuator, while the other used as the restoring wire. As the actuating wire is heated and contracts, the restoring wire is pulled in tension and undergoes stress-induced Martensitic transformation. The restoring wire has a high initial stiffness, and then a lower stiffness after Martensitic transformation. Thus the restoring wire acts as a negative-differential spring and decreases the amount of temperature change necessary to transform the actuating wire. To reverse this process, the restoring wire is heated and acts as an actuator in the reverse direction while the other wire acts as the restoring wire.

The main use of differential SMA actuators is to shorten cycling time of the actuation system. This setup, however, is not generally suited to an application where only conductive heating is available, such as the gas-lift safety valve application discussed above in connection with FIGS. 1-3 and 5A-5B.

Figure 6:
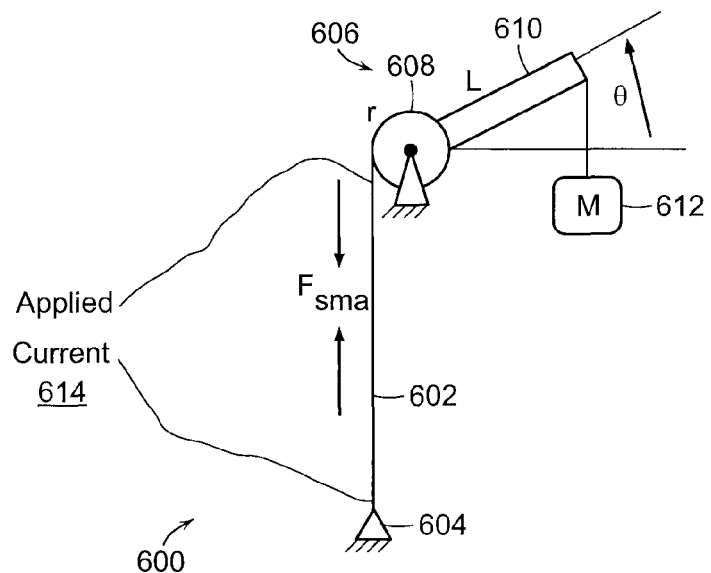
FIG. 6 is a schematic diagram illustrating a test arrangement used to form a thermal actuator including a shape memory alloy and having a sharp phase change, according to an example embodiment.

Referring now to FIGS. 6-9, a first test arrangement and associated test of a thermal actuator including a shape memory alloy and having a sharp phase change is discussed. FIG. 6 illustrates a first test arrangement 600 used to form a thermal actuator including a shape memory alloy and having a sharp phase change, according to an example embodiment. Test arrangement 600 generally represents an electrical heating arrangement of a shape memory alloy useable to illustrate the negative-differential spring concept described above.

In the embodiment shown, the test arrangement 600 includes a shape memory alloy 602 interconnected between a ground 604 and a rotatable lever 606. The rotating lever 606 includes a generally circular portion 608 and an arm 610. A mass 612 is pivotally attached to an end of the arm 610, such that in the embodiment shown the mass 612 hangs downwardly from the arm 610. A current source 614 applies current across the shape memory alloy 602 to heat the alloy, including through a temperature change between $A_s$ and $A_f$.

Assuming the circular portion 608 has a radius r and the mass 612 is represented as M connected at a distance L from the pivot point (i.e., the length Of the arm 610 extending from the pivot point), the stress force applied to the shape memory alloy, $\sigma_{SMA}$, is found by dividing the total force applied by the cross sectional area of the wire:

$$\sigma_{SMA} = \frac{MgL}{Ar}\cos\theta$$

where θ represents the angle of the arm 610 from horizontal, and g is the gravitational constant. To form a negative-differential spring (i.e., having a stress characteristic in which stress decreases as displacement increases), the lever 606 is initially started at a positive angle q between zero and 90 degrees from horizontal. As the SMA wire 602 is heated it contracts, rotating the lever 606 up to a final angle also between zero and 90 degrees. The cosine of the angle decreases as the angle increases, and thus the external stress applied to the wire decreases as the wire heats up.

To validate the effects of a negative-differential spring, the test arrangement can likewise be configured to represent a positive spring, in which applied stress increases as displacement increases. In this example, the lever 610 is initially started at a negative angle between negative 90 degrees and zero degrees. As the SMA wire 602 is heated and contracts it rotates the lever 610 up to a final angle also between −90 degrees and zero degrees. The cosine of the angle increases in this scenario, meaning the external stress in the wire increases as the wire is heated.

In the first test arrangement 600, the lever 610 is started at an initial angle of 40 degrees to achieve a negative-differential spring, and current is applied to the wire 602 until it completely transitions from Austenite to Martensite. A 0.5-kg mass is used, with a 0.1-m lever and 0.51-m initial SMA wire length. Current is increased approximately linearly over a 20-minute time interval, as illustrated further in FIG. 7. A Crossbow CXTA01 inclinometer is used to measure the rotation of the lever 610, and a BK Precision 1672 DC Power Supply used to provide electrical current to the wire 602.

Figure 7:
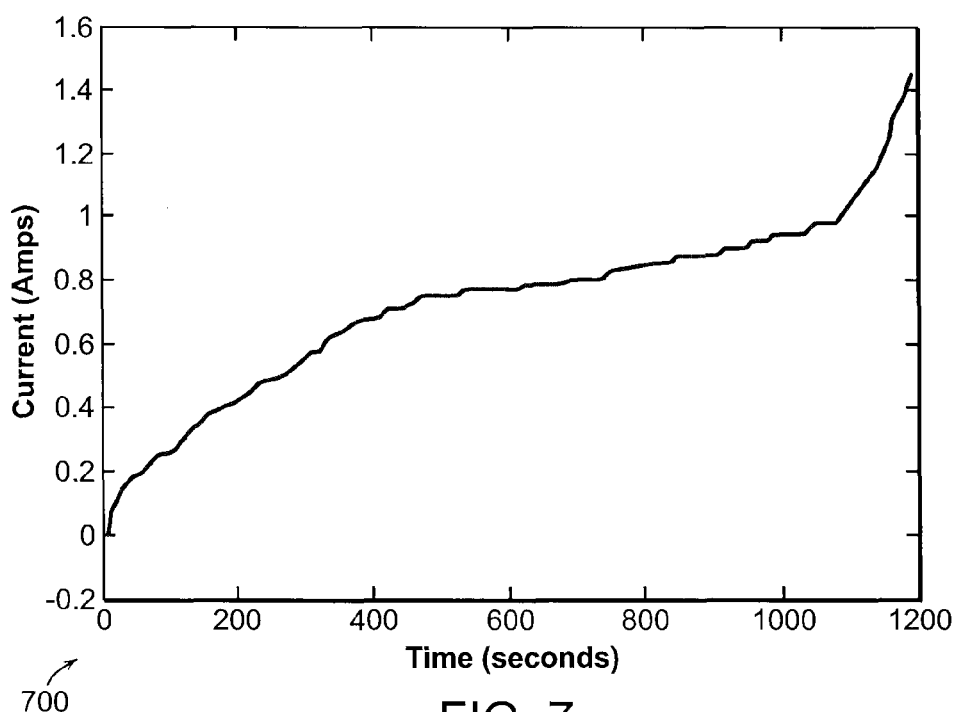
FIG. 7 is a chart representing current passing through a shape memory alloy over time during a tested temperature change in the test arrangement of FIG. 6.

FIG. 7 illustrates a chart 700 representing a plot of current against time for a test of the arrangement 600, in both the positive spring and negative-differential spring configurations. As seen in the chart 700, current is initially zero, and is gradually increased over time to approximately 1.5 amperes.

Figure 8:
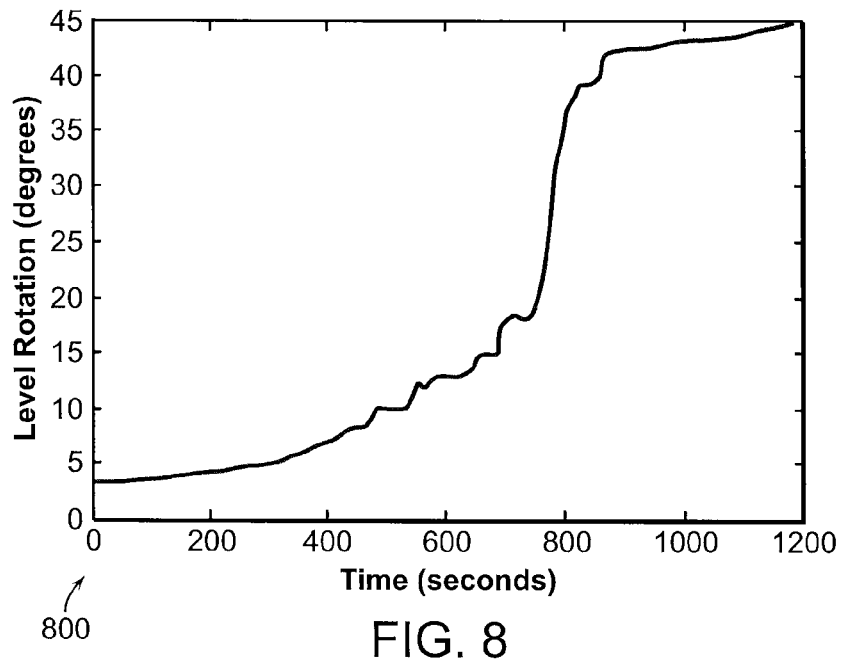
FIG. 8 is a chart illustrating rotation of a lever used as a negative-differential spring in the test arrangement of FIG. 6, concurrent with the current applied as illustrated in FIG. 7.

FIG. 8 illustrates a chart 800 representing a plot of lever rotation against time for the test arrangement 600, and in response to application of the current illustrated in the chart 700 of FIG. 7. As can be seen in the chart 800, at approximately the 800 seconds mark of the plot, a sharp transition occurs in the amount of lever rotation, between about 20 and about 45 degrees.

Figure 9:
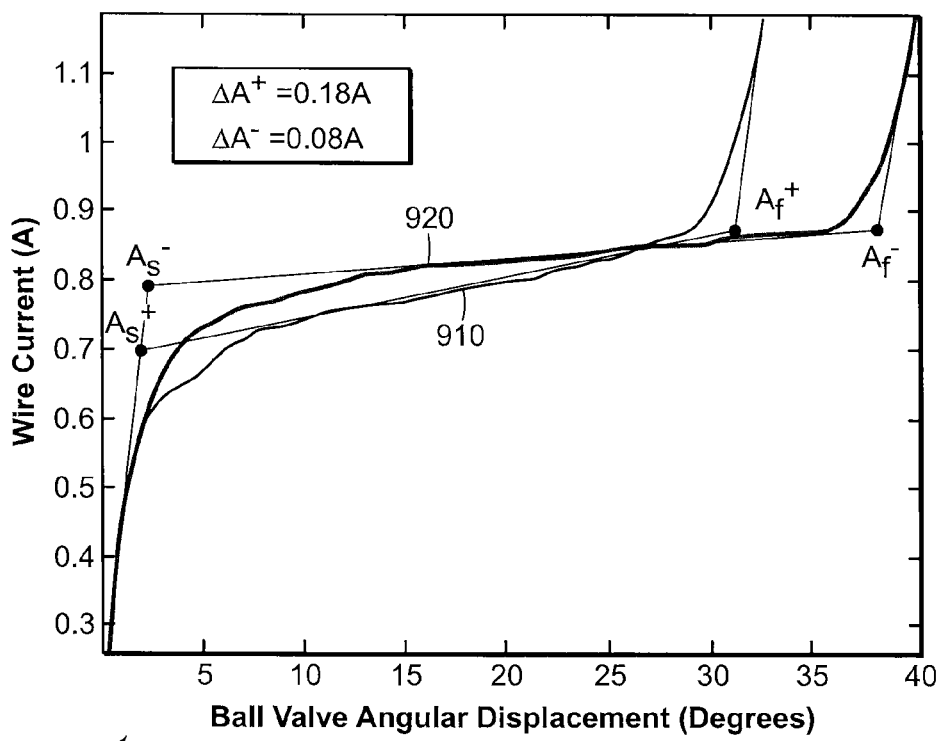
FIG. 9 is a chart illustrating angular displacement of a ball valve actuated by a shape memory alloy in the test arrangement illustrated in FIG. 6, illustrating a difference in response when using a positive spring and a negative-differential spring when applying a current as illustrated in FIG. 7.

FIG. 9 illustrates a chart 900 that compares experimental results of rotation of a lever 610 under positive spring and negative-differential spring configurations. Specifically, chart 900 represents an averaged, filtered set of experimental results over five experiments using the current application in chart 700 on the test arrangement 600. As seen in FIG. 9, a positive spring plot 910 indicates that, for the positive spring the $A_s^+-A_f^+$ difference is 0.18 Amperes. Comparatively, a negative spring plot 920 illustrates that for the negative-differential spring the $A_s^--A_f^-$ difference is 0.08 Amperes. If current is assumed to be roughly proportional to temperature in the wire 602 above an ambient temperature, then this 0.1-Ampere difference would correspond to an approximately 5° C. decrease in $A_s-A_f$ spread, using the masses and lever arm values stated above. Thus, the thermally actuated safety valve is potentially applicable to wells with gas-oil temperatures less than 6° C., even with relatively small changes to the force applied. Additionally, the SMA wire 602 contracts more in the negative-differential spring scenario. It is suspected that this is because, at the end of the heating cycle the wire contraction must overcome a smaller restoring force with a negative differential spring than with a positive spring. This finding could allow less SMA wire length to be used in a thermal actuator, such as in the gas lift safety valve applications described above.

In use, it is noted that application of a negative-differential spring to a shape memory alloy of a valve actuator will allow reduction of a threshold temperature change required to cause movement of a valve between open and closed positions. When the shape memory alloy experiences a change in temperature, including a change that would in the absence of the negative-differential spring be insufficient to complete the Martensite-Austenite transition, the valve actuator including the shape memory alloy can cause actuation of the valve. For example, in the case of a gas-lifted well, the temperature change may be in response to introduction of a gas at a first temperature (e.g., for gas lifting), and detection of a liquid at a second temperature (i.e., higher temperature hydrocarbons rising through the valve), thereby causing actuation of the valve associated with the sharp response valve actuator discussed herein.

It is noted that, although the experimental results in FIGS. 6-9 are provided based on observation using a lever-arm type negative-differential spring, other types of negative-differential spring could be used to similar effect. Accordingly, the particular negative-differential spring that would be used is at least somewhat dependent upon application. For example, opposed shape memory alloys may be useable in a circumstance where current-based actuation is available, but might not be used where only conductive heating is available, such as in the gas-lifted well arrangements discussed herein. Other arrangements discussed herein, such as a mass on a lever rotating from horizontal to vertical, a coiled metal ribbon of decreasing width, and a wire rotating a cam of decreasing radius, may also have other circumstances where they may or may not be the optimal negative-differential spring. However, the various embodiments discussed herein, when components are selected to match the temperatures experienced by the shape memory alloy and the characteristics of the shape memory alloy, will allow the safety valve to actuate with less than a 6° C. temperature difference. More broadly, this invention would allow any device actuated by SMAs to become much more precise, i.e. translating a small temperature change into a large displacement.

Figure 10:
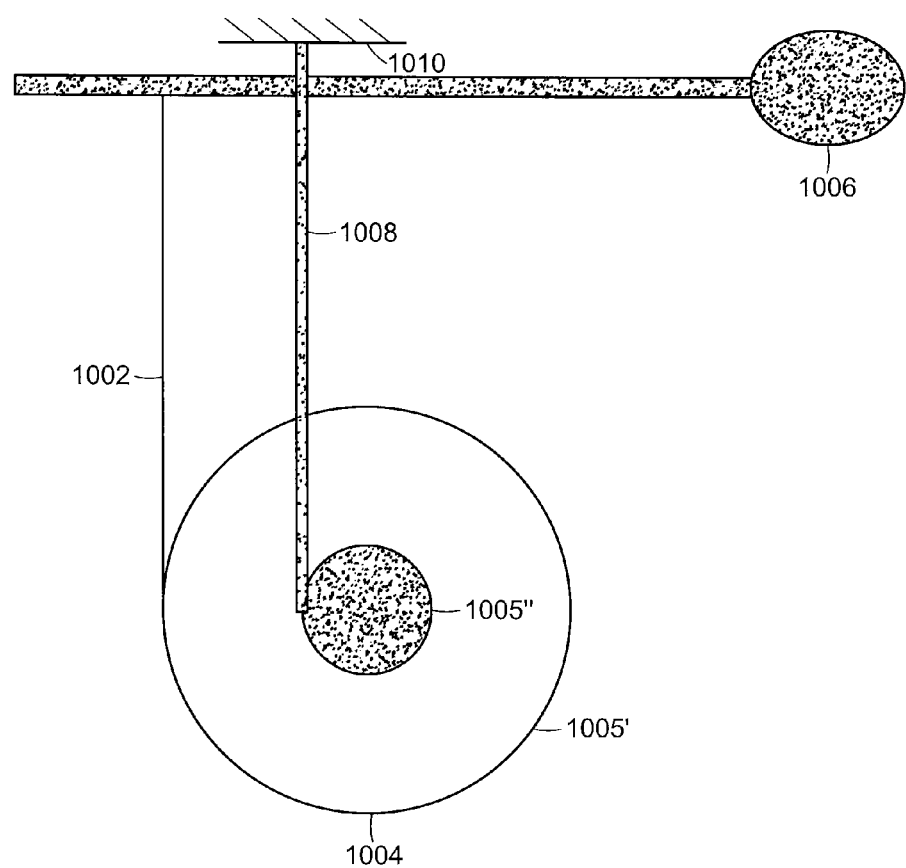
FIG. 10 is a schematic diagram illustrating an arrangement useable to form a thermal actuator including a shape memory alloy and having an expansion element.
Figure 11:
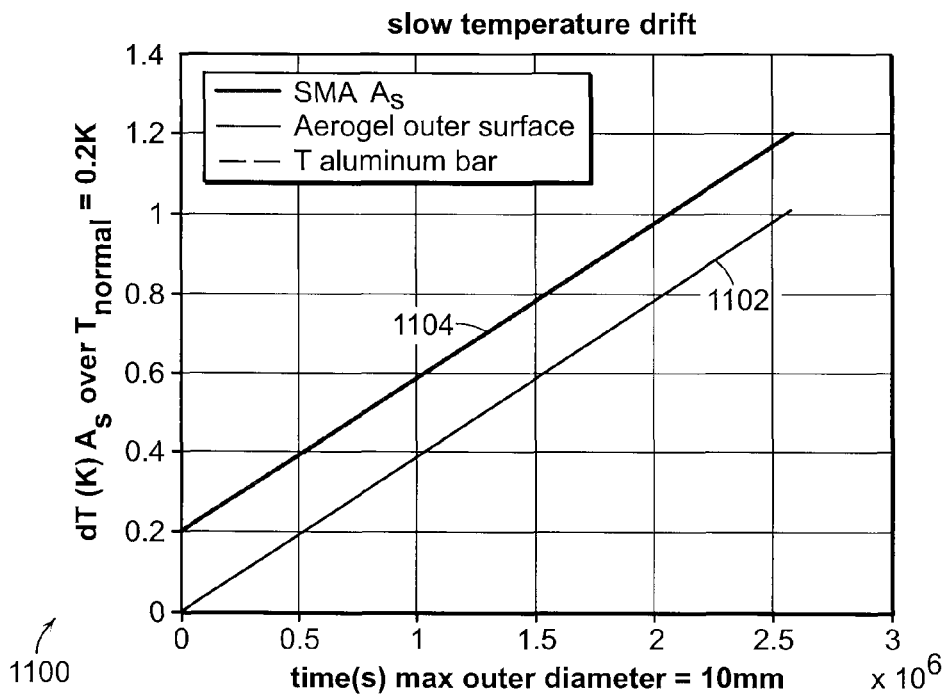
FIG. 11 is a chart representing a slow temperature change, in the arrangement of FIG. 10.
Figure 12:
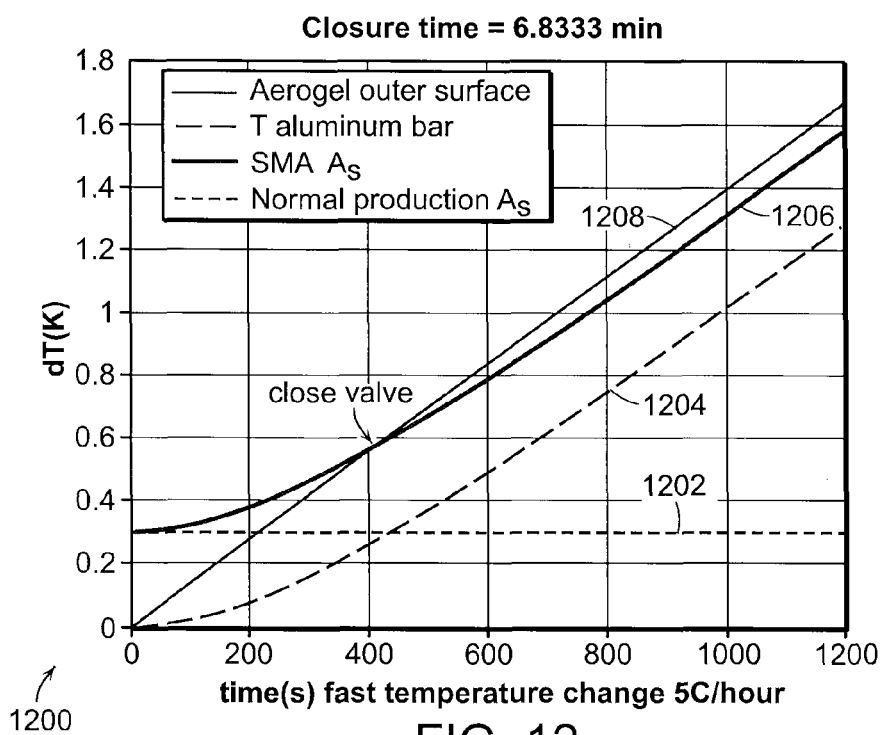
FIG. 12 is a chart representing actuation of a shape memory element in response to a fast temperature change, in the arrangement of FIG. 10.

Referring now to FIGS. 10-12, a second possible test arrangement 1000 is shown, illustrating additional features that can be incorporated into a valve actuator consistent with the present disclosure. In the embodiment shown, the test arrangement 1000 provides a system in which gradual temperature changes (e.g., temperature changes on the order of one degree Celsius per month) are compensated for using an expansion element. In general, the features described in connection with FIGS. 10-12 can be used in conjunction with the features described above to provide a valve actuator that has a sharp switching point (within a relatively narrow temperature band) while also compensating for gradual temperature changes that may be the result of environmental factors not otherwise intended to affect the valve actuator. Referring back to the following equation, it is noted that a switching point, $A_s$, can be affected by strain σ as follows:

$$A_{s\sigma}=A_s+\sigma/C$$

Accordingly, in the test arrangement 1000, strain on a shape memory alloy is adjusted slowly based on changes in temperature, to adjust the switching point of the shape memory alloy. In the particular test arrangement 1000 as shown, a shape memory ally alloy element 1002 is affixed to a constant torque axle 1004 and a valve 1006. The shape memory alloy element 1002 can be any of a variety of types of shape memory alloy materials previously described, and the valve 1006 can be any type of example valve; in various embodiments, these components can be as described above in connection with FIGS. 1-5.

An expansion element 1008 connects to a housing 1010 of the gas lift valve (e.g., any portion of the body of valve 200). The expansion element 1008 is also affixed to the constant torque axle 1004. As such, the expansion element 1008 is affixed to the shape memory alloy element 1002 via the torque axle. In various embodiments, the expansion element 1008 can be manufactured out of a material that will change in length when subjected to temperature changes. For example, in the example implementation shown, the expansion element 1008 is an aluminum cylinder. In alternative implementations, other materials reacting to temperature changes could be used as well.

In the embodiment shown, the expansion element 1008 is thermally insulated, to provide for delayed response to temperature changes, while the shape memory alloy element 1002 is not thermally insulated. For example, the expansion element 1008 can be coated with an aerogel. This aerogel coating acts as a thermal insulator, thereby allowing the expansion element 1008 to react slowly to temperature changes. The shape memory alloy element 1002 not being thermally insulated results in its relatively faster reaction to temperature changes, for example as may be experienced during a failure condition as described above. While rates of temperature change may vary, it is generally observed that rates of temperature change of about one degree Celsius per day may be considered a gradual temperature change (i.e., more likely a natural ambient temperature change rather than being due to a reverse-flow condition), while rates of temperature change of about five degrees Celsius per hour or greater may indicate a reverse-flow condition in which actuation of a gas lift safety valve should occur.

In this arrangement 1000, a first end of the expansion element 1008 has a fixed position (i.e., is attached to the gas-lift valve housing 1010) and an opposite, second end is affixed to constant torque axle 1004 and free to move. As the expansion element 1008 experiences temperature changes, the expansion element 1008 slowly expands or contracts, causing the free second end to change position. The movement of the free end of the expansion element 1008 causes movement of the constant torque axle 1004, and in turn affects a tensile stress on shape memory alloy element 1002. In particular, an increase in temperature causing extension of the expansion element 1008 away from the fixed end results in added tensile stress placed on the shape memory alloy element 1002, thereby increasing the temperature at which the shape memory alloy actuates the valve 1006. However, if the increase in temperature is "fast" (i.e., faster than is reacted to by the insulated expansion element 1008), the tensile stress, and therefore the temperature of actuation of the shape memory alloy element 1002, remains unchanged. Similarly, contractions of the expansion element 1008 (i.e., due to a decrease in temperature over a period of time) causes a decrease in the tensile stress in the shape memory alloy element 1002, thereby lowering a temperature at which actuation of the valve occurs.

In the embodiment shown, the length of the shape memory alloy element 1002 and the expansion element 1008 are selected, and the particular design of the constant torque axle is selected to amplify tensile stress changes resulting from expansion or contraction of the expansion element. In particular, the shape memory alloy element 1002 and the expansion element are connected to the constant torque axle 1004 at differing radii 1005', 1005" to amplify the tensile stress changes resulting from expansion or contraction of the expansion element 1008. In particular, the expansion element 1008 is connected to the inner radius 1005', and the shape memory alloy element is connected to the outer radius 1005", thereby amplifying the effects of a change in length of the expansion element 1008. In an example embodiment, the shape memory alloy has a length of approximately five inches, and the expansion element 1008 has a length of approximately 5.5 inches. In addition, the expansion element 1008 has a diameter of 6 mm for an aluminum rod portion, and a diameter of approximately 0.5 inches for the aerogel coating. Generally, the structural design of the arrangement as shown can be reflected as follows:

$$L_{bar}/L_{sma}=5.5/N \text{ (N=axle radii ratio)}$$

Generally, the increase in the tensile stress causes the shape memory alloy element's transition temperature to increase. The decrease in the tensile stress causes the shape memory alloy element's transition temperature to decrease. As shown in FIG. 11, a chart 1100 is depicted that shows that, during periods of slow temperature changes the shape memory alloy element 1002 and the expansion element 1008 each experience gradual changes in temperature as represented by line 1102. This line represents a temperature at an outer surface of the aerogel as well as a temperature of the surrounded aluminum bar, indicating that any temperature change to which the aerogel is exposed is sufficiently slow that it is equivalently experienced at the bar of the expansion element 1008. As shown by line 1104, the gradual increase in temperature also results in the Austenite start temperature of the shape memory alloy element 1002 to increase. This increase is due to the increased tensile stress within the shape memory alloy element 1002 cause by the expansion of the expansion element 1008. Because line 1104 and line 1102 do not cross (i.e., the switching temperature $A_s$ is never reached), the shape memory alloy element 1002 will not close the valve 1006. One skilled in the art will recognize, in view of the present disclosure, this arrangement represents a "slow" temperature change, in which there is no temperature differential between the environment and the aluminum bar.

In contrast, FIG. 12 illustrates a chart 1200 reflecting a fast temperature change. Line 1202 represents the Austenite start temperature during normal well production. Line 1204 represents the temperature of the expansion element 1008. Line 1206 represents the shape memory alloy element's 1002 Austenite start temperature, as affected by the stress applied by the expansion element 1008. Line 1208 represents the outer temperature of the expansion element's 1008 insulation (i.e., the experienced temperature of the test arrangement). In this test, because the Austenite start temperature of the shape memory alloy element 1002 meets the experienced outer temperature at the aerogel. In FIG. 12, this is represented by the intersection of lines 1206 and 1208.

Although in FIG. 12 the intersection of lines 1206, 1208 occurs after about 6.833 minutes, it is noted that this arrangement only illustrates one possible embodiment, and one possible rate of change of temperature (e.g., about 5 degrees Celsius per hour). Now referring to FIGS. 13-15, additional charts are shown depicting alternative test results using the test arrangement 1000 of FIG. 10.

Figure 13:
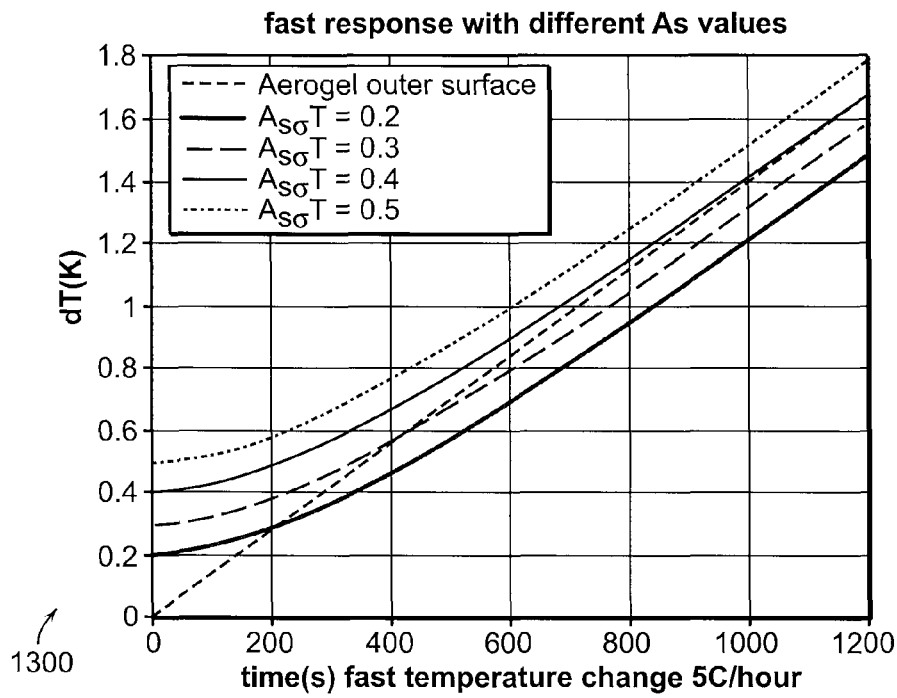
FIG. 13 is a chart showing differing Austenite start values, for selection and use in a temperature-compensated valve actuator.

FIG. 13 illustrates a chart 1300 representing a plot showing the effect of selecting materials having varying Austenite start temperatures for the test arrangement 1000. As seen in the arrangement shown, As can be seen in the chart 1300, only two of the example $A_s$ values result in a switching action occurring (i.e., at an intersection with a line representing temperature of the outer surface of the aerogel).

Figure 14:
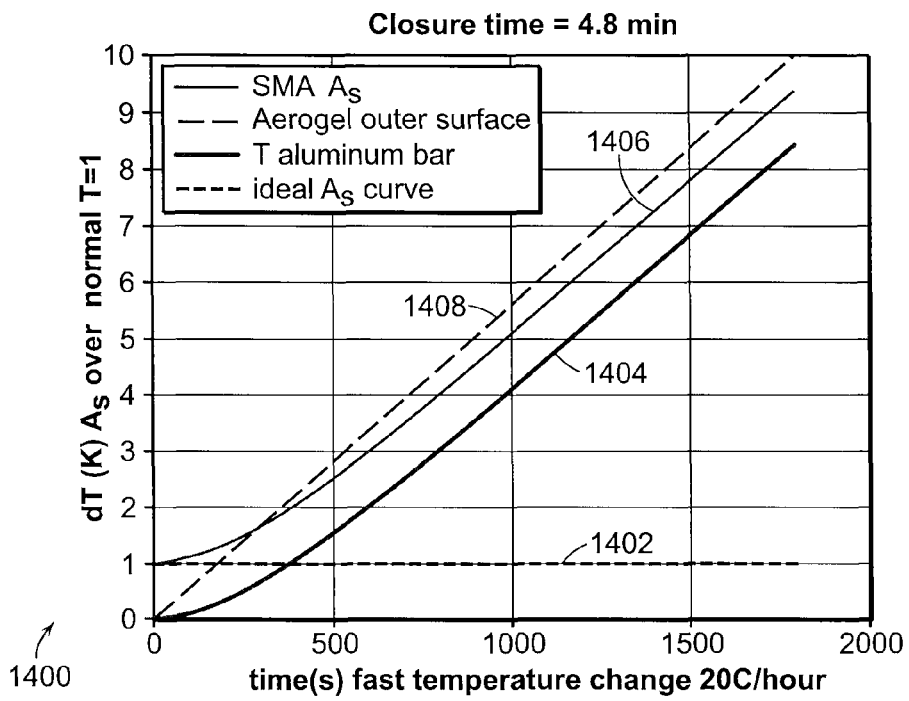
FIG. 14 is a chart representing actuation of a shape memory element in response to a second example fast temperature change, in the arrangement of FIG. 10.

FIG. 14 illustrates a chart 1400 representing a plot showing the effect of a differing rate of temperature change. In this chart, a 20 degree Celsius per hour rate of temperature change occurs. As seen in this chart, line 1402 represents the Austenite start temperature during normal well production, line 1404 represents the temperature of the expansion element 1008, and line 1206 represents the shape memory alloy element's 1002 Austenite start temperature, as affected by the stress applied by the expansion element 1008. Line 1208 represents the outer temperature of the expansion element's 1008 insulation. In FIG. 14 the intersection of lines 1406, 1408 occurs after about 4.8 minutes, rather than 6.833 minutes as observed in the arrangement of FIG. 12.

Figure 15:
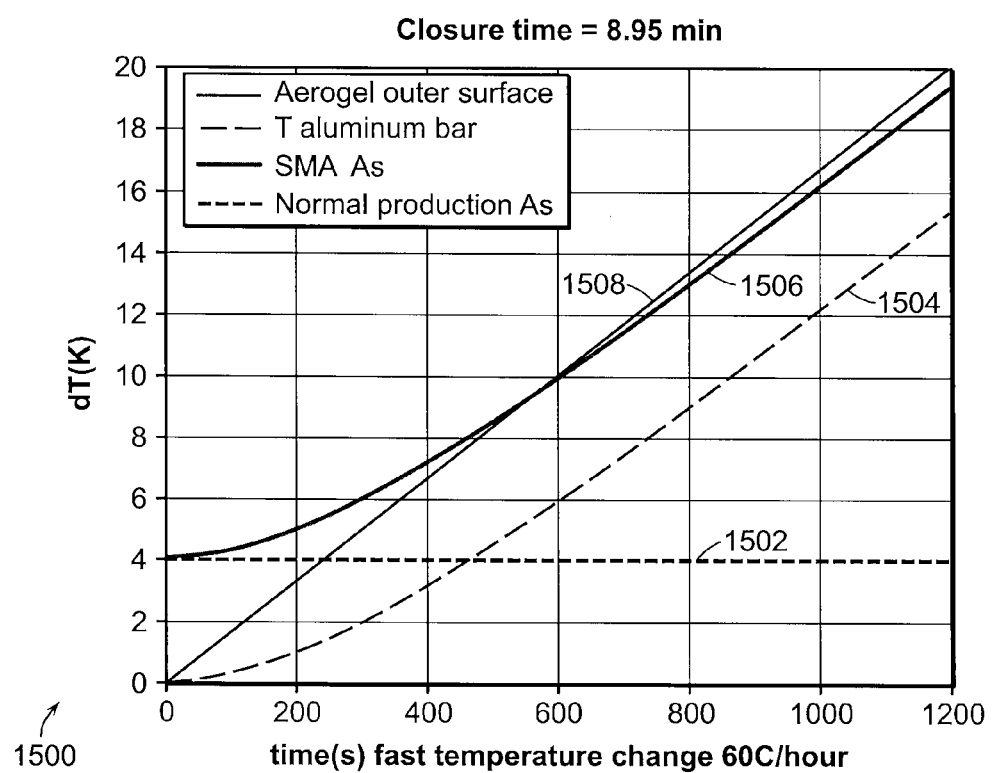
FIG. 15 is a chart representing actuation of a shape memory element in response to a third example fast temperature change, in the arrangement of FIG. 10.

FIG. 15 illustrates a chart 1500 representing a plot showing the effect of a still further rate of temperature change. In this chart, a 60 degree Celsius per hour rate of temperature change occurs. As seen in this chart, line 1502 represents the Austenite start temperature during normal well production, line 1504 represents the temperature of the expansion element 1008, and line 1506 represents the shape memory alloy element's 1002 Austenite start temperature, as affected by the stress applied by the expansion element 1008. Line 1508 represents the outer temperature of the expansion element's 1008 insulation. In FIG. 15 the intersection of lines 1506, 1508 occurs after about 8.95 minutes, rather than 6.833 minutes as observed in the arrangement of FIG. 12.

It is noted that, although the test arrangement and results of FIGS. 10-15 are provided based on observation using an aluminum bar expansion element, other types of structures could be used to similar effect. Furthermore, the test arrangement of FIG. 10 can be used in connection with the above arrangements relating to applying a biasing spring, to both provide sharp phase change of a shape memory alloy and also allowing for gradual temperature drift of the overall environmental temperature.

The foregoing description of illustrated embodiments of the present disclosure, including what is described in the abstract, is not intended to be exhaustive or to limit the disclosure to the precise forms disclosed herein. While specific embodiments of, and examples for, the disclosure are described herein for illustrative purposes only, various equivalent modifications are possible within the spirit and scope of the present disclosure, as those skilled in the relevant art will recognize and appreciate. As indicated, these modifications may be made to the present disclosure in light of the foregoing description of illustrated embodiments.

Thus, while the present disclosure has been described herein with reference to particular embodiments thereof, a latitude of modification, various changes and substitutions are intended in the foregoing disclosures, and it will be appreciated that in some instances some features of embodiments of the disclosure will be employed without a corresponding use of other features without departing from the scope of the disclosure. Therefore, many modifications may be made to adapt a particular situation or material to the essential scope of the present disclosure. It is intended that the disclosure not be limited to the particular terms used in following claims and/or to the particular embodiment disclosed as the best mode contemplated for carrying out this disclosure, but that the disclosure will include any and all embodiments and equivalents falling within the scope of the appended claims.

The invention claimed is:

1. A valve actuator comprising:
   a shape memory alloy element attachable to a valve body, the shape memory alloy element capable of use with a valve to cause movement of the valve between first and second positions at a predetermined temperature and responsive to at least a threshold amount of temperature change of the shape memory alloy element; and
   an expansion element attached to the shape memory alloy element, the expansion element responsive to temperature changes at a rate lower than a rate of change of temperature indicative of a valve leak, the expansion element adjusting tension on the shape memory alloy element, thereby changing the predetermined temperature.

2. The valve actuator of claim 1, further comprising a negative-differential spring applied to the shape memory alloy element, thereby reducing the threshold amount of temperature change needed to cause movement of the valve between the first and second positions.

3. The valve actuator of claim 1, further comprising a torque axle, wherein the expansion element is attached to the shape memory alloy element via the torque axle.

4. The valve actuator of claim 3, wherein the expansion element is connected to an inner radius of the torque axle, and the shape memory alloy element is connected to an outer radius of the torque axle.

5. The valve actuator of claim 1, wherein the expansion element comprises an aluminum rod surrounded by a thermal insulator.

6. The valve actuator of claim 5, wherein the thermal insulator comprises an aerogel coating.

7. The valve actuator of claim 1, wherein the shape memory alloy element contracts from a first length to a second length when heated from a first temperature to a second temperature.

8. The valve actuator of claim 7, wherein the first temperature is an Austenitic start temperature, and wherein the second temperature is an Austenitic finish temperature.

9. The valve actuator of claim 8, wherein the Austenitic start temperature corresponds to the predetermined temperature.

10. The valve actuator of claim 1, wherein the first and second positions correspond to open and closed valve positions.

11. The valve actuator of claim 1, wherein the valve actuator fully actuates over a temperature change of less than about 6° C. within a predetermined amount of time.

12. The valve actuator of claim 11, wherein the predetermined amount of time is approximately an hour.

13. The valve actuator of claim 1, wherein the valve actuator remains unactuated over a temperature change of greater than at least 1° C. if the temperature change occurs over a time period greater than a rate of temperature change of the expansion element.

14. A valve, comprising:
   a valve body;
   an orifice within the valve body;
   a fluid flow restraining member located at a first location of the orifice, the fluid flow restraining member movable between a closed position and an open position;
   a shape memory alloy element connected to the fluid flow restraining member, the shape memory alloy element causing pivotal movement of the fluid flow restraining member between open and closed positions responsive to at least a threshold amount of temperature change of the shape memory alloy element; and
   an expansion element attached to the shape memory alloy element, the expansion element responsive to temperature changes at a rate lower than a rate of change of temperature indicative of a valve leak, the expansion element adjusting tension on the shape memory alloy element, thereby changing the threshold amount of temperature change.

15. The valve of claim 14, wherein the fluid flow restraining member is pivotable between the closed position and the open position.

16. The valve of claim 14, further comprising a torque axle, wherein the expansion element is attached to the shape memory alloy element via the torque axle.

17. The valve of claim 14, wherein the expansion element comprises an aluminum rod surrounded by a thermal insulator.

18. The valve of claim 17, wherein changes in length of the expansion element apply varying tensile stresses on the shape memory alloy element, thereby adjusting an Austenitic start temperature of the shape memory alloy element based on gradual changes in temperature.

* * * * *